US012565571B2

(12) United States Patent
Tombolato

(10) Patent No.: US 12,565,571 B2
(45) Date of Patent: Mar. 3, 2026

(54) COMPOSITION COMPRISING SCATTERING PARTICLES

(71) Applicant: Trinseo Europe GmbH, Horgen (CH)

(72) Inventor: Sylvain Tombolato, Horgen (CH)

(73) Assignee: Trinseo Europe GmbH, Pfaeffikon (CH)

( * ) Notice: Subject to any disclaimer, the term of this patent is extended or adjusted under 35 U.S.C. 154(b) by 549 days.

(21) Appl. No.: 17/914,132

(22) PCT Filed: Mar. 25, 2021

(86) PCT No.: PCT/EP2021/057845
§ 371 (c)(1),
(2) Date: Sep. 23, 2022

(87) PCT Pub. No.: WO2021/191394
PCT Pub. Date: Sep. 30, 2021

(65) Prior Publication Data
US 2023/0110105 A1 Apr. 13, 2023

(30) Foreign Application Priority Data

Mar. 26, 2020 (FR) ...................................... 2002984

(51) Int. Cl.
*C08K 3/22* (2006.01)
*C08L 33/12* (2006.01)

(52) U.S. Cl.
CPC ............... *C08K 3/22* (2013.01); *C08L 33/12* (2013.01); *C08K 2003/2237* (2013.01); *C08K 2201/003* (2013.01); *C08K 2201/011* (2013.01); *C08K 2201/014* (2013.01); *C08L 2201/10* (2013.01)

(58) Field of Classification Search
None
See application file for complete search history.

(56) References Cited

U.S. PATENT DOCUMENTS

| | | | | |
|---|---|---|---|---|
| 8,013,062 B2 | 9/2011 | Ruzette et al. | | |
| 11,046,867 B2 | 6/2021 | Lin et al. | | |
| 2003/0031438 A1* | 2/2003 | Kambe | .................... | G02B 1/02 |
| | | | | 385/129 |
| 2003/0175004 A1* | 9/2003 | Garito | .................... | G02B 1/046 |
| | | | | 385/143 |
| 2007/0265381 A1* | 11/2007 | Kikuchi | .................... | G02B 1/04 |
| | | | | 524/428 |

| | | | |
|---|---|---|---|
| 2009/0326120 A1 | 12/2009 | Kawagoshi et al. | |
| 2016/0365541 A1 | 12/2016 | Wehlus | |
| 2017/0023722 A1 | 1/2017 | Schmidt et al. | |
| 2018/0052260 A1 | 2/2018 | Ge et al. | |
| 2020/0057176 A1 | 2/2020 | Sugawara et al. | |

FOREIGN PATENT DOCUMENTS

| | | | | |
|---|---|---|---|---|
| CN | 106433450 A | 2/2017 | | |
| CN | 106458717 A | 2/2017 | | |
| CN | 107533249 A | 1/2018 | | |
| CN | 110248999 A | 9/2019 | | |
| DE | 102012216081 A1 | 3/2013 | | |
| EP | 1864274 A2 | 12/2007 | | |
| WO | 03062293 A1 | 7/2003 | | |
| WO | 2004034136 A1 | 4/2004 | | |
| WO | WO-2011018746 A1 * | 2/2011 | ............... | C08K 3/22 |
| WO | 2011124412 A1 | 10/2011 | | |
| WO | 2011134674 A1 | 11/2011 | | |
| WO | WO-2017132137 A1 * | 8/2017 | ........... | H10H 20/854 |

OTHER PUBLICATIONS

International Search Report and Written Opinion for International Application No. PCT/US2021/057845, dated Jun. 16, 2021, 14 pages.
Office Action (The First Office Action) issued Jan. 30, 2024, by the State Intellectual Property Office of People's Republic of China in corresponding Chinese Patent Application No. 202180024265.3 and an English translation of the Office Action. (15 pages).
Xu, "Practical Techniques of Plastic Modification", China Light Industry Press, 1st edition, (Oct. 31, 2012), pp. 156-158, with English translation. (10 pages).
Office Action (Third Office Action) issued Dec. 28, 2024, by the National Intellectual Property Administration, P. R. China in corresponding Chinese Patent Application No. 202180024265.3 and an English translation of the Office Action. (29 pages).

* cited by examiner

*Primary Examiner* — Katarzyna I Kolb
(74) *Attorney, Agent, or Firm* — BUCHANAN INGERSOLL & ROONEY PC

(57) ABSTRACT

The present invention relates to a composition comprising scattering particles. In particular the present invention relates to polymeric composition comprising scattering particles for lightning applications or light guides. The invention also relates to a process for manufacturing such a polymeric composition comprising scattering particles for lightning applications or light guides. More particularly the present invention relates to a polymeric (meth)acrylic composition comprising inorganic scattering particles for lightning applications or light guides.

14 Claims, No Drawings

COMPOSITION COMPRISING SCATTERING PARTICLES

CROSS REFERENCE TO RELATED APPLICATIONS

This application is the U.S. National Phase application of International Application PCT/EP2021/057845, filed on Mar. 25, 2021, which claims priority to French Patent Application No. 2002984, filed on Mar. 26, 2020, the contents of each of which are incorporated by reference in their entireties for all purposes.

FIELD OF THE INVENTION

The present invention relates to a composition comprising particles.

In particular, the present invention relates to polymeric composition comprising scattering particles for lightning applications or light guides. The invention also relates to a process for manufacturing such a polymeric composition comprising scattering particles for lightning applications or light guides.

More particularly the present invention relates to a polymeric (meth)acrylic composition comprising inorganic scattering particles for lightning applications or light guides.

Technical Problem

Transparent materials are widely used for lightning applications. In order to also diffuse light these transparent materials comprise scattering particles. Depending on the loading of scattering particles, the transparent materials are still transparent or become semi-transparent, translucent or opaque, but all diffuse the light due to the scattering particles.

Lightning covers are for example in form of sheets or bended sheets or forms that are more complex. The light source is behind the cover. Depending on the application, the cover can transparent or opaque, in the latter case to hide the light source.

Light diffusing bodies can be a screen or a transmission screen used in optical applications.

Light guides or light guide bodies are for example in form of sheets or wedges or rods. They often have a light source that enters the light perpendicular to the light emitting surface, but the light can be entered also by other means.

As the light sources differs, either from technology of the light source or wavelength of the emitted light, it is difficult to have a good homogenous scattered light. If colored light or white light is scattered it should not change the color, meaning that there should be no color shift.

Additionally the intensity of the scattered light, the homogeneity of the transmission, both are influenced by choice of scattering particles.

The objective of the present invention is to obtain a composition comprising scattering particles that has a sufficient transparency while diffusing the light, especially in light guide bodies, for having also a sufficient luminous intensity.

An objective of the present invention is also to have a composition comprising particles and having a light transmission that is homogenous, meaning that the light transmission does not varies in an important manner as function of the wavelength of the visible light.

A still another objective is to propose a composition comprising scattering particles that has a reduced color shift of the light, especially in light diffusing body or light guide bodies, meaning for example that white light coming from the light source stays white and does not looks colored, when see through light diffusing body or light guide.

Another objective of the present invention is to provide lightning covers or light diffusing body or light guides or light guide bodies having a light transmission that is homogenous, meaning that the light transmission does not varies in an important manner as function of the wavelength of the visible light and having a reduced shift of color tone of the light.

Still an additional objective is having a process for preparing a composition comprising scattering particles that has a sufficient transparency while diffusing the light, especially in lightning covers or light diffusing body or light guide bodies, for having also a sufficient luminous intensity and a reduced shift of color tone of the light.

Still a further objective is the use of the composition comprising scattering particles that has a sufficient transparency while diffusing the light, especially in lightning covers or light diffusing body or light guide bodies, for having also a sufficient luminous intensity in lightning applications or light guides and a reduced shift of color tone of the light.

Still a further objective is the use of the composition comprising scattering particles to prepare another composition that has a sufficient transparency while diffusing the light, especially in lightning covers or light diffusing body or light guide bodies, for having also a sufficient luminous intensity in lightning applications or light guides and a reduced shift of color tone of the light.

BACKGROUND OF THE INVENTION

The document EP1864274 discloses a luminous device comprising at least one light-emitting diode and at least one cover made of a transparent plastic in which particles that scatter the light emitted by the light-emitting diode are dispersed. the scattering particles must have a mean diameter of between 0.5 and 100 μm and scattering particles polyamide particles, PTFE particles, crosslinked styrene-based particles, methyl-methacrylate-based crosslinked particles or silicone particles are $BaSO_4$, $TiO_2$, ZnO, $CaCO_3$, MgO or $Al_2O_3$ particles or hollow glass microspheres.

The document DE102012216081 discloses the manufacturing of a light diffusing molded part by injection molding. The composition for injection molding comprises a matrix of polymethyl methacrylate and spherical plastic particles with a particle size of 1 to 24 μm.

The document WO2004/034136 discloses a bulk diffuser for a flat panel display. The bulk light diffuser material may be a sheet or film comprising of polycarbonate and a particulate light diffusing component. PMMA and silicone particles are used in the examples.

The document WO2011/124412 discloses light guide bodies having improved luminous intensity and transparency. The light guide bodies consist of polymethyl methacrylate and 0.1 to 100 wt ppm of titanium dioxide particles with an average particle size of 150-500 nm.

None of the prior art documents discloses a composition as claimed comprising especially the inorganic particles of the current invention or its use or light guide comprising it.

SUMMARY

Surprisingly it has been found that a composition C1 comprising a) a transparent material M1 and, b) inorganic particles P1 having a refractive index comprising an inorganic compound either of the formula $AB_xC_{1-x}X_3$, wherein x is from 0 to 1 and A, B, and C are cations and X is an anion; or inorganic particle P1 comprises an inorganic compound the formula $A'_{1-y}A''_yCX_3$, wherein y is from 0 to 1 and A', A'', and C are cations and X is an anion; or inorganic particle P1 comprises an inorganic compound the formula $A'_{1-y}A''_yB_xC_{1-x}X_3$, wherein x is from 0 to 1, y is from 0 to 1 and A', A'', B, and C are cations and X is an anion, said particles are having a weight average particle diameter $d_1$ between 1 nm and 1 μm, c) particles P2 that are different from the inorganic particles P1, said difference between particles P1 and particles P2 is either the refractive index n or the weight average particle diameter d or both;

characterized in that the sum of particles P1 and P2 represents between 0.1 ppm and 10 wt % of the composition C1 comprising the components a), b) and c), yields to a composition that possesses homogenous light transmission or diffusion and reduced change of colour tone.

Surprisingly it has also been found that a polymeric composition comprising a) a transparent material M1 and, b) inorganic particles P1 having a refractive index comprising an inorganic compound either of the formula $AB_xC_{1-x}X_3$, wherein x is from 0 to 1 and A, B, and C are cations and X is an anion; or inorganic particle P1 comprises an inorganic compound the formula $A'_{1-y}A''_yCX_3$, wherein y is from 0 to 1 and A', A'', and C are cations and X is an anion; or inorganic particle P1 comprises an inorganic compound the formula $A'_{1-y}A''_yB_xC_{1-x}X_3$, wherein x is from 0 to 1, y is from 0 to 1 and A', A'', B, and C are cations and X is an anion, said particles are having a weight average particle diameter $d_1$ between 1 nm and 1 μm, c) particles P2 that are different from the inorganic particles P1, said difference between particles P1 and particles P2 is either the refractive index n or the weight average particle diameter d or both;

characterized in that the sum of particles P1 and P2 represents between 0.1 ppm and 10 wt % of the composition C1 comprising the components a), b) and c), yields to a composition that possesses homogenous light transmission or diffusion and reduced change of colour tone.

Surprisingly it has also been found that a process for manufacturing a composition C1 comprising the steps of:

a) providing inorganic particles P1 having a refractive index $n_1$, comprising an inorganic compound either of the formula $AB_xC_{1-x}X_3$, wherein x is from 0 to 1 and A, B, and C are cations and X is an anion; or inorganic particle P1 comprises an inorganic compound the formula $A'_{1-y}A''_yCX_3$, wherein y is from 0 to 1 and A', A'', and C are cations and X is an anion; or inorganic particle P1 comprises an inorganic compound the formula $A'_{1-y}A''_yB_xC_{1-x}X_3$, wherein x is from 0 to 1, y is from 0 to 1 and A', A'', B, and C are cations and X is an anion, said particles are having a weight average particle diameter $d_1$ between 1 nm and 1 μm, b) particles P2 that are different from the inorganic particles P1, said difference between particles P1 and particles P2 is either the refractive index n or the weight average particle diameter d or both;

c) incorporating the particles P1 and P2 in a transparent material M1;

characterized in that the sum of particles P1 and P2 represents between 0.1 ppm and 10 wt % of the composition C1 comprising the components a), b) and c), yields to a composition C1 that possesses homogenous light transmission or diffusion and reduced change of colour tone.

Surprisingly it has also been found that article comprising a composition C1, said composition C1 comprises a) a transparent material M1 and, b) inorganic particles P1 having a refractive index $n_1$; comprising an inorganic compound either of the formula $AB_xC_{1-x}X_3$, wherein x is from 0 to 1 and A, B, and C are cations and X is an anion; or inorganic particle P1 comprises an inorganic compound the formula $A'_{1-y}A''_yCX_3$, wherein y is from 0 to 1 and A', A'', and C are cations and X is an anion; or inorganic particle P1 comprises an inorganic compound the formula $A'_{1-y}A''_yB_xC_{1-x}X_3$, wherein x is from 0 to 1, y is from 0 to 1 and A', A'', B, and C are cations and X is an anion, said particles are having a weight average particle diameter $d_1$ between 1 nm and 1 μm, c) particles P2 that are different from the inorganic particles P1, said difference between particles P1 and particles P2 is either the refractive index n or the weight average particle diameter d or both;

characterized in that the sum of particles P1 and P2 represents between 0.1 ppm and 10 wt % of the composition C1 comprising the components a), b) and c), yields to a composition that possesses homogenous light transmission or diffusion and reduced change of colour tone.

Surprisingly it has been found that a composition C1 comprising a) a transparent material M1 and, b) inorganic particles P1 having a refractive index $n_1$; comprising an inorganic compound either of the formula $AB_xC_{1-x}X_3$, wherein x is from 0 to 1 and A, B, and C are cations and X is an anion; or inorganic particle P1 comprises an inorganic compound the formula $A'_{1-y}A''_yCX_3$, wherein y is from 0 to 1 and A', A'', and C are cations and X is an anion; or inorganic particle P1 comprises an inorganic compound the formula $A'_{1-y}A''_yB_xC_{1-x}X_3$, wherein x is from 0 to 1, y is from 0 to 1 and A', A'', B, and C are cations and X is an anion, said particles are having a weight average particle diameter $d_1$ between 1 nm and 1 μm, and c) particles P2 that are different from the inorganic particles P1, said difference between particles P1 and particles P2 is either the refractive index n or the weight average particle diameter d or both;

characterized in that sum of particles P1 and P2 represents between 0.1 ppm and 10 wt % of the composition C1 comprising the components a), b) and c), can be used for preparing a composition C2 in that the sum of quantity of particles P1 and P2 represents less than 1000 ppm or preferably between 0.1 ppm and 1000 ppm, said composition C2 is having homogenous light transmission.

DETAILED DESCRIPTION OF THE INVENTION

According to a first aspect, the present invention relates to a composition C1 comprising a) a transparent material M1 and, b) inorganic particles P1 having a refractive index $n_1$, comprising an inorganic compound either of the formula $AB_xC_{1-x}X_3$, wherein x is from 0 to 1 and A, B, and C are cations and X is an anion; or inorganic particle P1 comprises an inorganic compound the formula $A'_{1-y}A''_yCX_3$, wherein y is from 0 to 1 and A', A'', and C are cations and X is an anion; or inorganic particle P1 comprises an inorganic compound the formula $A'_{1-y}A''_yB_xC_{1-x}X_3$, wherein x is from 0 to 1, y is from 0 to 1 and A', A'', B, and C are cations and X is an anion, said particles are having a weight average particle diameter $d_1$ between 1 nm and 1 μm, c) particles P2 that are different from the inorganic particles P1, said difference between particles P1 and particles P2 is either the refractive index n or the weight average particle diameter d or both;

characterized in that the sum of particles P1 and P2 represents between 0.1 ppm and 10 wt % of the composition C1 comprising the components a), b) and c).

According to a second aspect, the present invention relates to the use of a composition C1 comprising a) a transparent material M1 and, b) inorganic particles P1 having a refractive index $n_1$, comprising an inorganic compound either of the formula $AB_xC_{1-x}X_3$, wherein x is from 0 to 1 and A, B, and C are cations and X is an anion; or inorganic particle P1 comprises an inorganic compound the formula $A'_{1-y}A''_yCX_3$, wherein y is from 0 to 1 and A', A'', and C are cations and X is an anion; or inorganic particle P1 comprises an inorganic compound the formula $A'_{1-y}A''_yB_xC_{1-x}X_3$, wherein x is from 0 to 1, y is from 0 to 1 and A', A'', B, and C are cations and X is an anion, said particles are having a weight average particle diameter $d_1$ between 1 nm and 1 μm, c) particles P2 that are different from the inorganic particles P1, said difference between particles P1 and particles P2 is either the refractive index n or the weight average particle diameter d or both;

characterized in that the sum of particles P1 and P2 represents between 0.1 ppm and 10 wt % of the composition C1 comprising the components a), b) and c), in lightning applications.

In a third aspect the present invention relates to a process for manufacturing a composition C1 comprising the steps of:

a) providing inorganic particles P1 having a refractive index $n_1$, comprising an inorganic compound either of the formula $AB_xC_{1-x}X_3$, wherein x is from 0 to 1 and A, B, and C are cations and X is an anion; or inorganic particle P1 comprises an inorganic compound the formula $A'_{1-y}A''_yCX_3$, wherein y is from 0 to 1 and A', A'', and C are cations and X is an anion; or inorganic particle P1 comprises an inorganic compound the formula $A'_{1-y}A''_yB_xC_{1-x}X_3$, wherein x is from 0 to 1, y is from 0 to 1 and A', A'', B, and C are cations and X is an anion, said particles are having a weight average particle diameter $d_1$ between 1 nm and 1 μm, b) providing particles P2 that are different from the inorganic particles P1, said difference between particles P1 and particles P2 is either the refractive index n or the weight average particle diameter d or both c)) incorporating the particles P1 and P2 in a transparent material M1;

characterized in that sum of particles P1 and P2 represents between 0.1 ppm and 10 wt % of the composition C1 comprising the components a), b) and c).

In a fourth aspect the present invention relates to a process for manufacturing an article for lightning applications comprising the steps of a) providing a composition C1 as defined before, b) transforming the composition C1.

In a fifth aspect the present invention relates to an article comprising a composition C1, said composition C1 comprises a) a transparent material M1 and, b) inorganic particles P1 having a refractive index comprising an inorganic compound either of the formula $AB_xC_{1-x}X_3$, wherein x is from 0 to 1 and A, B, and C are cations and X is an anion; or inorganic particle P1 comprises an inorganic compound the formula $A'_{1-y}A''_yCX_3$, wherein y is from 0 to 1 and A', A'', and C are cations and X is an anion; or inorganic particle P1 comprises an inorganic compound the formula $A'_{1-y}A''_yB_xC_{1-x}X_3$, wherein x is from 0 to 1, y is from 0 to 1 and A', A'', B, and C are cations and X is an anion, said particles are having a weight average particle diameter $d_1$ between 1 nm and 1 μm, c) particles P2 that are different from the inorganic particles P1, said difference between particles P1 and particles P2 is either the refractive index n or the weight average particle diameter d or both;

characterized in that the sum of particles P1 and P2 represents between 0.1 ppm and 10 wt % of the composition C1 comprising the components a), b) and c).

In a sixth aspect the present invention relates to a process for manufacturing a composition C2 comprising the steps of:

a) providing a composition C1 comprising a2) a transparent material M1 and, a1) inorganic particles P1 having a refractive index $n_1$, comprising an inorganic compound either of the formula $AB_xC_{1-x}X_3$, wherein x is from 0 to 1 and A, B, and C are cations and X is an anion; or inorganic particle P1 comprises an inorganic compound the formula $A'_{1-y}A''_yCX_3$, wherein y is from 0 to 1 and A', A'', and C are cations and X is an anion; or inorganic particle P1 comprises an inorganic compound the formula $A'_{1-y}A''_yB_xC_{1-x}X_3$, wherein x is from 0 to 1, y is from 0 to 1 and A', A'', B, and C are cations and X is an anion, said particles are having a weight average particle diameter $d_1$ between 1 nm and 1 μm, so that the particles P1 represents at least 1000 ppm of the composition C1 comprising the components a1) and a2)

a3) particles P2 that are different from the inorganic particles P1, said difference between particles P1 and particles P2 is either the refractive index n or the weight average particle diameter d or both; sum of particles P1 and P2 represents between 0.1 ppm and 10 wt % of the composition C1;

b) blending the composition C1 with a transparent material M2; characterized in that the sum of particles P1 and P2 represents less than 1000 ppm by weight in the composition C2.

According to a seventh aspect, the present invention relates to the use of a composition C1 comprising a) a transparent material M1 and, b) inorganic particles P1 having a refractive index $n_1$, comprising an inorganic compound either of the formula $AB_xC_{1-x}X_3$, wherein x is from 0 to 1 and A, B, and C are cations and X is an anion; or inorganic particle P1 comprises an inorganic compound the formula $A'_{1-y}$ $A''_y CX_3$, wherein y is from 0 to 1 and A', A'', and C are cations and X is an anion; or inorganic particle P1 comprises an inorganic compound the formula $A'_{1-y}$ $A''_y B_x C_{1-x} X_3$, wherein x is from 0 to 1, y is from 0 to 1 and A', A'', B, and C are cations and X is an anion, said particles are having a weight average particle diameter $d_1$ between 1 nm and 1 µm, c) particles P2 that are different from the inorganic particles P1, said difference between particles P1 and particles P2 is either the refractive index n or the weight average particle diameter d or both;

characterized in that the sum of particles P1 and P2 represents between 0.1 ppm and 10 wt % of the composition C1 comprising the components a), b) and c), to prepare a compositions C2, preferably the sum of particles P1 and P2 represents less than 1000 ppm by weight in the composition C2.

By the term "particle" as used is denoted a more or less spherical polymer comprising particle or inorganic particle in the nanometer range. Preferably the particle has a weight average particle size between 2 nm and 1000 nm. By By the term "particle size" as used is denoted the weight average diameter of a particle considered as spherical (equivalent sphere having same weight or volume, both connected via density).

By the term "copolymer" as used is denoted that the polymer consists of at least two different monomers.

By the term "(meth)acrylic monomer" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "transparent" as used is denoted that the respective material has a light transmittance according to ASTM D-1003 (sheet of 3 mm thickness) of at least 85%.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

According to the invention, preferred embodiments for different respective characteristics of the components can be combined in any combination. As for example the preferred weight average particle diameter $d_2$ of the particle P2 can be combined with preferred weight average particle diameter $d_1$ of the inorganic particle P1; or as for example the preferred weight average particle diameter $d_2$ of the particle P2 can be combined with preferred choices of cations A, A' or A'' of inorganic compound of inorganic particle P1.

With regard to the composition C1 of the invention, it comprises a) transparent material M1, b) inorganic particles P1 having a refractive index $n_1$ comprising a an inorganic compound either of the formula $AB_x C_{1-x} X_3$, wherein x is from 0 to 1 and A, B, and C are cations and X is an anion; or inorganic particle P1 comprises an inorganic compound the formula $A'_{1-y} A''_y CX_3$, wherein y is from 0 to 1 and A', A'', and C are cations and X is an anion; or inorganic particle P1 comprises an inorganic compound the formula $A'_{1-y}$ $A''_y B_x C_{1-x} X_3$, wherein x is from 0 to 1, y is from 0 to 1 and A', A'', B, and C are cations and X is an anion; said particles are having a weight average particle diameter $d_1$ between 1 nm and 1 µm and c) particles P2 that are different from the inorganic particles P1, said difference between particles P1 and particles P2 is either the refractive index n or the weight average particle diameter d or both.

Preferably the numbers x and y in the formulas are a rational number from 0 to 1.

The relative weight quantity of the sum inorganic particles P1 and particles P2 is between 0.1 ppm and 10 wt % by weight of the composition C1 comprising the components a), b) and c).

Preferably the quantity of the sum inorganic particles P1 and particles P2 is between 1 ppm and 10 wt % in the composition C1 comprising the components a), b) and c).

In a first more preferred embodiment the composition C1 comprises between 0.1 ppm and 100 ppm by weight of the sum inorganic particles P1 and particles P2 in the composition C1 calculated on the components a), b) and c).

In a second more preferred embodiment the composition C1 comprises between 10 ppm and 1000 ppm by weight of the sum inorganic particles P1 and particles P2 in the composition C1 calculated on the components a), b) and c).

In a third more preferred embodiment the composition C1 comprises between 100 ppm and 1000 ppm by weight of the sum inorganic particles P1 and particles P2 in the composition C1 calculated on the components a), b) and c).

In a fourth more preferred embodiment the composition C1 comprises between 1 ppm and 5 ppm by weight of the sum inorganic particles P1 and particles P2 in the composition C1 calculated on the components a), b) and c).

In a fifth more preferred embodiment the composition C1 comprises between 1.25 wt % and 10 wt % by weight of the sum inorganic particles P1 and particles P2 in the composition C1 calculated on the components a), b) and c). In a more preferred embodiment the composition C1 comprises between 1 ppm and 150 ppm by weight of the sum inorganic particles P1 and particles P2 in the composition C1 calculated on the components a), b) and c)

The composition C1 can comprise also other compounds, which are not taken into account for the calculation of the weight ratios between the three compounds a), b) and c).

The composition C1 can comprise for example impact modifiers, colorants or other additives.

With regard to the transparent material M1, it is chosen from glass or transparent polymers.

In a first preferred embodiment the transparent material M1 is a transparent polymer PO1. The polymer PO1 can be thermoplastic polymer or thermoset polymer. In case of the thermoplastic polymer it is also considered as part of the invention that the thermoplastic polymer can be crosslinked or slightly crosslinked as long as a piece of this polymer can still be formed and change shape, as for example by thermoforming.

The transparent polymer PO1 can be chosen from (meth) acrylic polymers, polycarbonate, polystyrenes, polyesters, polyvinylchloride (PCV), cyclic olefin copolymers, styrene methyl methacrylate (SMMA), styrene acrylonitrile (SAN), polyvinylidene fluoride (PVDF) and blends thereof.

In a first preferred embodiment the transparent polymer PO1 is a composition comprising at least 50 wt % of a (meth)acrylic polymer composition MPCo, preferably at least 60 wt % and more preferably at least 70 wt %.

In a second preferred embodiment the transparent polymer P1 is a (meth)acrylic polymer composition MPCo.

The (meth)acrylic polymer composition MPCo can be chosen from a (meth)acrylic block copolymer or a (meth) acrylic polymer MP1 or a crosslinked (meth)acrylic composition MCX.

With regard to the (meth)acrylic polymer MP1 it is a polymeric polymer chain comprising at least 50 wt % of monomers coming from acrylic and/or methacrylic monomers. The (meth)acrylic polymer MP1 could also be a mixture of two or more (meth)acrylic polymer AP1 to APx.

The acrylic and/or methacrylic monomers are chosen from acrylic acid, methacrylic acid, esters of acrylic acid of esters of methacrylic acid, alkyl acrylic monomers, alkyl methacrylic monomers and mixtures thereof.

Preferably the monomer is chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic.

Advantageously the (meth)acrylic monomer is chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate and mixtures thereof.

Other comonomers can be copolymerized with the acrylic and/or methacrylic monomers as long as the (meth)acrylic polymer AP1 is comprising at least 50 wt % of monomers coming from acrylic and/or methacrylic monomers in its polymeric chain. The other comonomers can be chosen from styrenic monomers as styrene or styrene deriviatives, acrylonitrile, vinylesters as vinylacetate. The amount of these comonomers is from 0 wt % to 50 wt %, preferably from 0 wt % to 40 wt %, more preferably from 0 wt % to 30 wt %, advantageously from 0 wt % to 20 wt %.

In a first more preferred embodiment the (meth)acrylic polymer MP1 is a thermoplastic homo- or copolymer of methyl methacrylate (MMA) that comprises at least 50%, preferably at least 60%, advantageously at least 70% and more advantageously at least 80% by weight of methyl methacrylate.

The copolymer of methyl methacrylate (MMA) comprises between 50% and 99.9% by weight of methyl methacrylate and between 0.1 and 50% by weight of at least one monomer having at least one ethylenic unsaturation that can copolymerize with methyl methacrylate.

These monomers are well known and mention may be made, in particular of acrylic and methacrylic acids and alkyl-(meth)acrylates in which the alkyl group has from 1 to 12 carbon atoms. As examples, mention may be made of methyl acrylate and ethyl, butyl or 2-ethylhexyl (meth) acrylate. Preferably the comonomer is an alkyl acrylate in which the alkyl group having from 1 to 4 carbon atoms.

According to the first more preferred embodiment the copolymer of methyl methacrylate (MMA) comprises from 60% to 99.9% advantageously from 70% to 99.9% and more advantageously from 80% to 99.9% by weight of methyl methacrylate and from 0.1% to 40% advantageously from 0.1% to 30% and more advantageously from 0.1% to 20% by weight of at least one monomer having at least one ethylenic unsaturation that can copolymerize with methyl methacrylate. Preferably the comonomer is chosen from methyl acrylate or ethyl acrylate or mixtures thereof.

The (meth)acrylic polymer MP1 can optionally have a melt flow index (MFI) according to ISO 1133 (230° C./3.8 kg) between 0.1 g/10 min and 20 g/10 min. Preferably melt flow index can be between 0.2 g/10 min and 18 g/10 min, more preferably between 0.3 g/10 min and 16 g/10 min, advantageously between 0.4 g/10 min and 13 g/10 min.

The (meth)acrylic polymer MP1 has a refractive index between 1.46- and 1.52, preferably between 1.47 and 1.52 and more preferably between 1.48 and 1.52.

The (meth)acrylic polymer MP1 has a light transmittance according to ASTM D-1003 (sheet of 3 mm thickness) of at least 85%, preferably 86%, more preferably 87%.

The (meth)acrylic polymer MP1 has a Vicat softening temperature of at least 90° C. The Vicat softening temperature is measured according to ISO 306:2013 (B50 method).

The composition according to the invention can comprise beside the (meth)acrylic polymer MP1 also an (meth)acrylic polymer MP2. The (meth)acrylic polymer MP1 and (meth) acrylic polymer MP2 form a mixture or a blend. This mixture or blend consists of at least one homopolymer and at least one copolymer of MMA, or a mixture of at least two homopolymers or two copolymers of MMA with a different average molecular weight or a mixture of at least two copolymers of MMA with a different monomer composition.

In a second more preferred embodiment the (meth)acrylic polymer MP1 is crosslinked homo- or copolymer of methyl methacrylate (MMA) that comprises at least 50%, preferably at least 60%, advantageously at least 70% and more advantageously at least 80% by weight of methyl methacrylate.

The (meth)acrylic polymer MP1 of the second preferred embodiment comprises as well as crosslinker. Preferably the crosslinker is a copolymerizable compound having at least two double bonds.

In a third more preferred embodiment the (meth)acrylic polymer composition MPCo is a (meth)acrylic block copolymer MBC of methyl methacrylate (MMA) that comprises at least 50% of methyl methacrylate.

The (meth)acrylic block copolymer MBC comprises at least one block having a glass transition temperature less than 20° C. preferably less than 10° C. more preferably less than 0° C., advantageously less than −5° C. and more advantageously less than −10° C.

Preferably (meth)acrylic block copolymer MBC comprises at least one block which is an (meth)acrylic block. By this is meant that at least 50 wt % of the monomers inside this block are alkyl (meth)acrylate monomers, that have been polymerized.

Most preferably the (meth)acrylic block copolymer MBC comprises at least 50 wt % of the monomers inside (meth) acrylic block copolymer MBC are alkyl(meth)acrylate monomers, that have been polymerized.

The (meth)acrylic block copolymer MBC is having a general formula $(A)_n B$ in which:

n is an integer of greater than or equal to 1,

A is: an acrylic or methacrylic homo- or copolymer having a Tg of greater than 50° C., preferably of greater than 80° C., or polystyrene, or an acrylic/styrene or methacrylic/styrene copolymer. Preferably, A is chosen from methyl methacrylate (MMA), phenyl methacrylate, benzyl methacrylate or isobornyl methacrylate. Preferably, the block A is PMMA or PMMA modified with acrylic or methacrylic comonomers;

B is an acrylic or methacrylic homo- or copolymer having a Tg of less than 20° C., preferably comprising monomers chosen of methyl acrylate, ethyl acrylate, butyl acrylate (BuA), ethylhexyl acrylate, styrene (Sty) or butyl methacrylate, more preferably butyl acrylate said monomers make up at least 50 wt %, preferably 70 wt % of B.

Advantageously the (meth)acrylic block copolymer MBC is amorphous.

Preferably, in the block A the monomer is chosen from methyl methacrylate (MMA), phenyl methacrylate, benzyl methacrylate, isobornyl methacrylate, styrene (Sty) or alpha-methylstyrene or mixtures thereof. More preferably, the block A is PMMA or PMMA copolymerized with acrylic or methacrylic comonomers or polystyrene (PS) or PS modified with styrenic comonomers.

Preferably the block B comprises monomers chosen of methyl acrylate, ethyl acrylate, butyl acrylate (BuA), ethylhexyl acrylate or butyl methacrylate and mixtures thereof, more preferably butyl acrylate said monomers make up at least 50 wt %, preferably 70 wt % of block B.

Furthermore, the blocks A and/or B can comprise other acrylic or methacrylic comonomers carrying various chemical function groups known to a person skilled in the art, for example acid, amide, amine, hydroxyl, epoxy or alkoxy functional groups. The block A can incorporate groups, such as acrylic acid or methacrylic acid (MAA), in order to increase the temperature stability of thereof.

Comonomers like styrene can also be incorporated in the block B in order to mismatch the refractive index of the block A.

Preferably, said thermoplastic acrylic block copolymer has a structure chosen from: ABA, AB, $A_3B$ and $A_4B$.

The (meth)acrylic block copolymer MBC for example can be one of the following triblock copolymers: pMMA-pBuA-pMMA, p(MMAcoMAA)-pBuA-p(MMAcoMAA), p(MMAcoMAA)-p(BuAcoSty)-p(MMAcoMAA) and p(MMAcoAA)-pBuA-p(MMAcoAA). In a first preferred embodiment, the (meth)acrylic block copolymer MBC is p(MMAcoMAA)-p(BuAcoSty)-p(MMAcoMAA).

It is known to a person skilled in the art that the polymers of PMMA type can comprise small amounts of acrylate comonomer in order to improve the temperature stability thereof. By small is meant less than 9 wt %, preferably less than 7 wt % and more preferably less than 6 wt % of the polymer.

The block B represents from 10% to 85%, preferably 15% to 80% of the total weight of the block copolymer MBC.

The block B has a weight-average molar mass of between 10 000 g/mol and 500 000 g/mol, preferably from 20 000 g/mol to 300 000 g/mol. The weight average molar mass can be measured by size exclusion chromatography (SEC).

The (meth)acrylic block copolymers can be obtained by controlled radical polymerization (CRP) or by anionic polymerization; the most suitable process according to the type of copolymer to be manufactured will be chosen.

Preferably, this will be CRP, in particular in the presence of nitroxides, for the (meth)acrylic block copolymers of $(A)_nB$ type and anionic or nitroxide radical polymerization, for the structures of ABA type, such as the triblock copolymer MAM. Controlled radical polymerization is described in the document for obtaining block copolymers, i.e. in WO03/062293.

The (meth)acrylic block copolymer MBC can be transformed by extrusion or injection molding in form of a object.

In a fourth more preferred embodiment the (meth)acrylic polymer composition MPCo is a crosslinked (meth)acrylic composition MCX. consisting of a brittle matrix (I) having a glass transition temperature Tg of greater than 0° C. and of elastomeric domains having a characteristic dimension of less than 100 nm consisting of macromolecular sequences (II) having a flexible nature with a glass transition temperature of less than 0° C., characterized that the macromolecular sequences (II) having a flexible nature are having a weight average molecular weight Mw of between 150 000 g/mol and 800 000 g/mol.

As regards the matrix (I), it exhibits an overall Tg of greater than 0° C., measured by differential scanning calorimetry (DSC), and is compatible with the methyl methacrylate homo- or copolymer. Preferably glass transition temperature Tg is greater than 10° C., more preferably greater than 20° C., still more preferably greater than 40° C. even more preferably greater than 45° C., advantageously greater than 50° C. and more advantageously greater than 60° C.

The matrix (I) is prepared from methyl methacrylate and optionally one or more monomer(s) Mo1 chosen from:

acrylic monomers of formula $CH_2=CH—C(=O)—O—R_1$, where $R_1$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, acrylic acid, methyl acrylate, ethyl acrylate, propyl acrylate, n-butyl acrylate, isobutyl acrylate, tert-butyl acrylate, 2-ethylhexyl acrylate, glycidyl acrylate, hydroxyalkyl acrylates or acrylonitrile;

methacrylic monomers of formula $CH_2=C(CH_3)—C(=O)—O—R_2$, where $R_2$ denotes a hydrogen atom or a linear, cyclic or branched $C_1$-$C_{40}$ alkyl group optionally substituted by a halogen atom or a hydroxyl, alkoxy, cyano, amino or epoxy group, such as, for example, methacrylic acid, methyl methacrylate, ethyl methacrylate, propyl methacrylate, n-butyl methacrylate, isobutyl methacrylate, tert-butyl methacrylate, 2-ethylhexyl methacrylate, glycidyl methacrylate, hydroxyalkyl methacrylates or methacrylonitrile;

vinylaromatic monomers, such as, for example, styrene or substituted styrenes, such as α-methylstyrene, monochlorostyrene or tert-butylstyrene.

The comonomer(s) are chosen in nature and quantity that the lower limit of the glass transition temperature Tg is met.

Preferably methyl methacrylate is the predominant monomer in the polymer of the matrix (I). The matrix (I) thus includes a proportion of methyl methacrylate of from 51 wt % to 100 wt %, preferably between 75 wt % and 100 wt % and advantageously between 90 wt % and 100 wt %.

As regards the macromolecular sequences (II) having a flexible nature, said macromolecular sequences (II) they are also called block B in the present invention. These macromolecular sequences (II) having a flexible nature exhibit a glass transition temperature of less than 0° C. (denoted Tg and measured by DSC). Preferably the Tg is less than –5° C., more preferably less than –10° C. and even more preferably less than –15° C.

Furthermore, the weight-average molecular weight of the macromolecular sequences (II) having a flexible nature with a glass transition temperature of less than 0° C. is between 150 000 g/mol and 800 000 g/mol.

Preferably the weight-average molecular weight of the macromolecular sequences (II) having a flexible nature with a glass transition temperature of less than 0° C. is between 175 000 and 700 000 g/mol, more preferably between 200 000 g/mol and 650 000 g/mol, and advantageously between 225 000 g/mol and 600 000 g/mol.

The polydispersity index of the molecular weight Mw/Mn of the macromolecular sequences (II) having a flexible nature or block B is greater than 2, preferably greater than 2.5 and more preferably greater than 3.

The polydispersity index of the molecular weight Mw/Mn is between 2.5 and 10.0, preferably between 3.0 and 10.0, more preferably between 3.0 and 6.0 and even more preferably between 3.0 and 5.0.

With regard to the inorganic particle P1 according to the invention, it has a weight average particle size meaning weight average particle diameter $d_1$ between 1 nm and 1 μm.

Preferably the weight average particle diameter $d_1$ of the inorganic particle P1 is more than 5 nm, more preferably more than 10 nm, still more preferably more than 20 nm, again still more preferably more than 30 nm, advantageously more than 40 nm, even more advantageously more than 50 nm and advantageously more than 100 nm.

Preferably the weight average particle diameter $d_1$ of the inorganic particle P1 is less than 950 nm, more preferably less than 925 nm, still more preferably less than 900 nm, again still more preferably less than 875 nm, advantageously less than 850 nm, even more advantageously less than 800 nm and advantageously less than 750 nm.

Preferably the weight average particle diameter $d_1$ of the inorganic particle P1 is between 5 nm and 950 nm, more preferably between 10 nm and 950 nm, still more preferably between 20 nm and 900 nm, again still more preferably between 30 nm and 900 nm, advantageously between 40 nm and 850 nm, even more advantageously between 50 nm and 800 nm and advantageously between 100 nm and 750 nm.

The inorganic particle P1 comprises either an inorganic compound of the formula (1a)

$$AB_xC_{1-x}X_3 \qquad (1a)$$

wherein x is from 0 to 1 and A, B, and C are cations and X is an anion;

or inorganic particle P1 comprises an inorganic compound the formula (1b)

$$A'_{1-y}A''_yCX_3 \qquad (1b)$$

wherein y is from 0 to 1 and A', A'', and C are cations and X is an anion;

or inorganic particle P1 comprises an inorganic compound the formula (1c)

$$A'_{1-y}A''_yB_xC_{1-x}X_3 \qquad (1c)$$

wherein x is from 0 to 1, y is from 0 to 1 and A', A'', B, and C are cations and X is an anion In one embodiment in formula (1a) and (1c) x is 0 or 1. In another embodiment in formula (1b) and (1c) y is 1 or 0. If x=0 and y=0, the formulas (1a), (1b) and (1c) are simplified to formula $ACX_3$.

The inorganic compound of the formulas (1a), (1b) and (1c) represents from 50 wt % to 100 wt % of the inorganic particle P1. Preferably the inorganic compound of the formulas (1a), (1b) and (1c) represents from 60 wt % to 100 wt % of the inorganic particle P1, more preferably from 70 wt % to 100 wt %, still more preferably from 75 wt % to 100 wt %, advantageously from 80 wt % to 100 wt % and advantageously from 90 wt % to 100 wt %.

In a first preferred embodiment the X in all formulas (1a), (1b) and (1c) is oxygen O.

The cations A, A' or A'' the formulas (1a), (1b) and (1c) are chosen from metal cations and A' is different from A''. Preferably A, A' or A'' is an alkali metal cation or alkali earth metal cation, more preferably chosen from cations of lithium, sodium, potassium, beryllium, magnesium, calcium, strontium, barium, lanthanum or lead. Still more preferably A, A' or A'' is chosen from cations of lithium, sodium, potassium, beryllium, magnesium, calcium, strontium or barium. Advantageously A, A' or A'' is chosen from cations of magnesium, calcium, strontium or barium and still more advantageously A, A' or A'' is chosen from cations of calcium, strontium or barium The cation C is chosen from a metal cation of an element of UIPAC groups 3 to 7 of the periodic table of elements or from the lanthanides series of chemical elements. Preferably the cation C is chosen from cations of manganese, niobium, tantalum, titanium, zirconium or ytterbium. More preferably the cation C is chosen from cations of niobium, tantalum, titanium or zirconium.

The cation B is chosen from a metal cation of an element of UIPAC groups 3 to 7 of the periodic table of elements or from the lanthanides series of chemical elements and is different from C. Preferably B is chosen from cations of manganese, niobium, tantalum, titanium, zirconium or ytterbium. More preferably the cation B is chosen from cations of niobium, tantalum, titanium or zirconium.

Examples of compounds of formulas (1a), (1b) and (1c) are $LiTaO_3$, $LiNbO_3$, $KNbO_3$, $BaTiO_3$, $KTaO_3$, $PbZrO_3$, $PbZr_xTi_{1-x}O_3$, $Ba_ySr_{1-y}TiO_3$, $SrTiO_3$, $LaMnO_3$, $LaMnO_3$, $La_yCa_{1-y}TiO_3$, $LaYbO_3$ and $CaTiO_3$.

More preferably, the compound of the formulas (1a), (1b) and (1c) has perovskit structure.

More preferably the cation A, A' or A'' in formula (1) has an ionic radii of at least 100 pm. Advantageously the cation A, A' or A'' in formula (1) has an ionic radii of at least 105 pm and more advantageously at least 110 pm.

More preferably the cations B and C in formula (1) have an ionic radii of less than 100 pm. Advantageously the cations B and C in formula (1) have an ionic radii of less than 95 pm and more advantageously less than 90 pm.

The ionic radii of the respective ions can be found in encyclopedias. In a particular first preferred embodiment the inorganic compound of formula (1a) is $BaTiO_3$.

In a particular second preferred embodiment the compound of formula (1b) is $Ba_{1-y}Sr_yTiO_3$, with $0<y<1$.

In a particular third preferred embodiment the compound of formula (1a) is $BaZr_xTi_{1-x}O_3$ with $0<x<1$.

With regard to the particles P2 according to the composition of the invention, they are different from the inorganic particles P1, said difference between particles P1 and particles P2 is either the refractive index n or the weight average particle diameter d or both.

If the refractive index n is different between the particles P2 and P1, the particles P2 and P1 are of different chemical nature. The particles P2 can be organic particles, but also inorganic particles.

The difference between the refractive index $n_2$ of the particles P2 and the refractive index $n_1$ of the inorganic particles P1 is at least more than 0.01. This means $\Delta n=|n1-n2|$ with $\Delta n>0.01$.

Preferably $\Delta n>0.02$, more preferably $\Delta n>0.025$, still more preferably $\Delta n>0.03$, even still more preferably $\Delta n>0.05$ and advantageously $\Delta n>0.1$.

In a first more preferred embodiment the difference $\Delta n$ between the refractive index $n_2$ of the particles P2 and the refractive index $n_1$ of the inorganic particles P1 is $2>\Delta n>0.01$.

In a second more preferred embodiment the difference $\Delta n$ between the refractive index $n_2$ of the particles P2 and the refractive index $n_1$ of the inorganic particles P1 is $1>\Delta n>0.01$ If the weight average particle diameter d is different between the particles P2 and P1, the particles P2 and P1 are of different chemical nature or of same chemical nature.

The particles P2 has a weight average particle size meaning weight average particle diameter $d_2$ between 1 nm and 100 μm.

Preferably the weight average particle diameter $d_2$ of the particles P2 is more than 5 nm, more preferably more than 10 nm, still more preferably more than 15 nm, again still more preferably more than 20 nm, advantageously more than 30 nm, even more advantageously more than 40 nm and advantageously more than 50 nm.

Preferably the weight average particle diameter $d_2$ of the particles P2 is less than 100 μm, more preferably less than 95 μm, still more preferably less than 90 μm, again still more preferably less than 85 μm, advantageously less than 80 μm, even more advantageously less than 75 μm and advantageously less than 70 μm.

Preferably the weight average particle diameter $d_2$ of the particle P2 is between 5 nm and 100 μm, more preferably between 10 nm and 95 μm, still more preferably between 15 nm and 90 μm, again still more preferably between 20 nm and 85 μm, advantageously between 30 nm and 80 μm, even more advantageously between 40 nm and 75 μmm and advantageously between 50 nm and 70 μm.

The difference between the weight average particle diameter $d_2$ of the particles P2 and the weight average particle diameter $d_1$ of the inorganic particles P1 is at least more than 10 nm. This means $\Delta d = |d_1 - d_2|$ with $\Delta d > 10$ nm.

Preferably $\Delta d > 10$ nm, more preferably $\Delta d > 20$ nm, still more preferably $\Delta d > 30$ nm, even still more preferably $\Delta d > 40$ nm and advantageously $\Delta d > 50$ nm.

In a first more preferred embodiment the difference $\Delta d$ between the weight average particle diameter $d_2$ of the particles P2 and the weight average particle diameter $d_1$ of the inorganic particles P1 is 20 μm$>\Delta d>10$ nm.

If the refractive index n and the weight average particle diameter d is different between the particles P2 and P1, the particles P2 and P1 are of different chemical nature and different particles size as defined above.

The particles P2 can be organic particles or inorganic particles. The inorganic particles include all different embodiments of the inorganic particles P1, and P1 and P2 can be the same if the weight average particle diameter d is different.

The particles P2 can be chosen from polymeric particles. Polymeric particles can be polystyrene based particles, polyalkyl(meth)acrylate based particles, polyamide based particles or fluor polymer based particles.

The particles P2 can be chosen from inorganic particles. Inorganic particles can be metal oxides, metal sulfates and the like. Examples are $TiO_2$ or $BaSO_4$ or ZnO or $SiO_2$.

With regard to the process for the preparation of the composition C1 according to the invention it comprises the steps of a) providing inorganic particles P1, b) providing particles P2, c) incorporating the inorganic particles P1 and particles P2 in the transparent material M1.

Advantageously the process for manufacturing the composition C1 according to the invention it comprises the steps of a) providing inorganic particles P1, b) providing particles P2, c) providing the transparent material M1, d) incorporating the inorganic particles P1 and particles P2 in the transparent material M1.

The respective inorganic particles P1, and particles P2 and the transparent material M1 and their respective embodiments are the same as defined before.

The incorporating step can be made either by blending the inorganic particles P1 and particles P2 with the transparent material M1, or the incorporation step is divided into two substeps, where the inorganic particles P1 and particles P2 are blended with a precursor of the transparent material M1 comprising monomers followed by polymerization.

In a variation the inorganic particles P1 and particles P2 can be preblended.

With regard to the process for the preparation of the composition C2 from the composition C1 according to the invention it comprises the steps of comprises the steps of a) providing a composition C1, b) blending the composition C1 with a transparent material M2;

so that the composition C2 comprises less than 1000 ppm by weight of the sum of particles P1 and P2.

In this process for the preparation of the composition C2, the composition C1 serves as a masterbatch. This is also the aspect of the use of the composition C1 to prepare a composition C2 comprising less than 1000 ppm of the sum of particles P1 and P2.

The transparent material M2 in blending step b) is in excess of the composition C1.

In a first embodiment weight ratio of the transparent material M2 to composition C1 in blending step b) is above 2, preferably above 5, more preferably above 10.

In a second embodiment weight ratio of the transparent material M2 to composition C1 in blending step b) is above 5, preferably above 20, more preferably above 50.

In a third embodiment weight ratio of the transparent material M2 to composition C1 in blending step b) is above 10, preferably above 50, more preferably above 100.

In a fourth embodiment weight ratio of the transparent material M2 to composition C1 in blending step b) is between 2 and $10^6$.

Preferably the composition C2 comprises between 0.1 ppm and 1000 ppm by weight of the sum of particles P1 and P2.

In a first more preferred embodiment the composition C2 comprises between 0.1 ppm and 100 ppm by weight of the sum of particles P1 and P2 in the composition C2 calculated on the components a), b) and c).

In a second more preferred embodiment the composition C2 comprises between 10 ppm and 1000 ppm by weight of the sum of particles P1 and P2 in the composition C2 calculated on the components a), b) and c).

In a third more preferred embodiment the composition C2 comprises between 100 ppm and 1000 ppm by weight of the sum of particles P1 and P2 in the composition C2 calculated on the components a), b) and c).

In a fourth more preferred embodiment the composition C2 comprises between 1 ppm and 5 ppm by weight of the sum of particles P1 and P2 in the composition C2 calculated on the components a), b) and c).

With regard to the transparent material M2, it is chosen from glass or transparent polymers.

Preferably the transparent material M2 is chosen from the same materials as the transparent material M1.

In the composition C2 the transparent material M2 and the transparent material M1 can be the same.

In a first preferred embodiment the transparent material M2 is also a transparent polymer P1. The polymer P1 is the same as defined before.

According to an additional aspect the present invention concerns a process for manufacturing an article for lightning applications comprising the steps of a) providing a composition C1 or a composition C2, b) transforming the composition C1 or C2.

The article can be a cover for a light source or a light emitting device or a light diffusing bodies or a light guide body or light guide plate, depending on the quantity of the particles in the composition.

The light emitting device can be a light-emitting diode (LED) or laser diode (LD).

The composition C1 or C2 according to the invention can be used in lightning applications or in an article suitable for lightning applications.

The article can be a light guide.

The composition can for example be used in lightning applications or in an article suitable for lightning applications in form of a sheet, a wedge, a rod or a tube.

The sheet is having a thickness between 0.5 mm and 300 mm, preferably between 1 mm and 200 mm.

The wedge is having on its largest thickness between 4 mm and 300 mm, preferably between 5 mm and 200 mm.

The rod or the tube is having a diameter between 0.5 mm and 300 mm.

The sheets or rods or tubes or wedges manufactured from or with the compositions C1 according to the present invention can be used as light guide body or light guide plate, for example as edge lightning.

The light guide body or plate according to the invention preferably has at least a thickness of 0.5 mm. The light guide body or plate according to the invention preferably has at most a thickness of 50 mm. The thickness particularly preferably lies in the range of from 1 to 30 mm and more particularly preferably is from 2 to 25 mm.

The light guide body or plate may, also be assigned further layers, for example mirror or reflection layers.

[Methods of Evaluation]

Transmission and Haze

The luminous transmittance (transmission) and haze is measured on the respective sheets according to the standard ASTM D1003.

Molecular Weight

The mass average molecular weight (Mw) of the polymers is measured with by size exclusion chromatography (SEC). The chromatography column is calibrated with PMMA standards having a molecular weight between 402 g/mol and 1 900 000 g/mol. The average molecular weight are expressed in g/mol for the number and average molecular weight Mn and Mw respectively. For the measurement, the concentration of the polymer is 1 g/L.

Particle Size Analysis

The particle size of the scattering particles is measured with scanning electron microscopy (SEM). At least 50 particles are counted. The diameter of the particle size is the one of the circle filling the same area as the 2D image projection of the particle. The weight average particle size is calculated.

Refractive Index

The refractive index is measured with a refractometer at 589 nm at 20° C.

EXAMPLES

As PMMA a copolymer of methyl methacrylate as injection molding grade is used, having a melt flow index of 8 g/10 min.

The invention claimed is:

1. A composition C1 comprising:
a) a transparent material M1,
b) individual inorganic particles P1 having a refractive index $n_1$, comprising an inorganic compound selected from the group consisting of $BaTiO_3$, $Ba_{1-y}Sr_yTiO_3$, and $BaZr_xTi_{1-x}O_3$, wherein x is from 0 to 1 and y is from 0 to 1; said particles having a weight average particle diameter $d_1$ between 1 nm and 1 μm, and
c) individual inorganic particles P2 that are different from the inorganic particles P1, said difference between particles P1 and particles P2 is either the refractive index n or the weight average particle diameter d or both, said inorganic particles P2 comprising an inorganic compound selected from the group consisting of $BaTiO_3$, $Ba_{1-y}Sr_yTiO_3$, and $BaZr_xTi_{1-x}O_3$;
wherein the sum of particles P1 and P2 represents between 0.1 ppm and 10 wt % of the composition C1 comprising the components a) b) and c).

2. The composition according to claim 1, wherein the particles P2 have a refractive index $n_2$ that is different from the refractive index $n_1$ of the particles P1.

3. The composition according to claim 1, wherein the particles P2 have a refractive index $n_2$ that is at least more than 0.01 different from the refractive index $n_1$ of the particles P1.

4. The composition according to claim 1, wherein the weight average particle diameter $d_2$ of the particles P2 is different from the weight average particle diameter $d_1$ of the particles P1.

5. The composition according to claim 1, wherein the weight average particle diameter $d_2$ of the particles P2 is at least more than 10 nm different from the weight average particle diameter $d_1$ of the particles P1.

6. The composition according to claim 1, wherein the particles P2 have a refractive index $n_2$ and weight average particle diameter $d_2$ that are both different from the refractive index $n_1$ and the weight average particle diameter $d_1$ of the particles P1.

7. The composition C1 according to claim 1, wherein the composition C1 comprises between 0.1 ppm and 100 ppm by weight of the sum of particles P1 and P2 in the composition C1 calculated on the components a) b) and c).

8. The composition C1 according to claim 1, wherein the composition C1 comprises between 10 ppm and 1000 ppm by weight of the sum of particles P1 and P2 in the composition C1 calculated on the components a) b) and c).

9. The composition C1 according claim 1, wherein the transparent material M1 is a transparent polymer PO1.

10. The composition C1 according to claim 1, wherein the transparent material M1 is a transparent polymer PO1 comprising at least one of (meth) acrylic polymers, polycarbonate, polystyrenes, polyesters, polyvinylchloride (PCV), cyclic olefin copolymers, styrene methyl methacrylate (SMMA), styrene acrylonitrile (SAN), polyvinylidene fluoride (PVDF), or blends thereof.

11. The composition C1 according to claim 1, wherein the transparent material M1 is a transparent polymer PO1 composition comprising at least 50 wt % of a (meth)acrylic polymer composition MPCo.

12. A composition C2 comprising the composition C1 according to claim 1 comprising less than 1000 ppm of sum of inorganic particles P1 and P2.

13. The composition according claim 1, wherein the difference between the weight average particle diameter $d_2$ of the particles P2 and the weight average particle diameter $d_1$ of the particles P1 is more than 50 nm.

14. The composition according claim 1, wherein the difference between the weight average particle diameter $d_2$ of the particles P2 and the weight average particle diameter $d_1$ of the particles P1 is more than 50 nm and less than 20 μm.

* * * * *